(12) United States Patent
Yanagi

(10) Patent No.: US 7,340,479 B2
(45) Date of Patent: Mar. 4, 2008

(54) DATA MANAGING METHOD, DATA MANAGING SYSTEM, DATA MANAGING APPARATUS, DATA HANDLING APPARATUS, COMPUTER PROGRAM, AND RECORDING MEDIUM

(75) Inventor: Masae Yanagi, 1-7, Kagami-machi, Kashiwazaki-shi, Nigata 945-0053 (JP)

(73) Assignee: Masae Yanagi, Niigata (JP)

( * ) Notice: Subject to any disclaimer, the term of this patent is extended or adjusted under 35 U.S.C. 154(b) by 0 days.

(21) Appl. No.: 11/303,936

(22) Filed: Dec. 19, 2005

(65) Prior Publication Data

US 2006/0095449 A1 May 4, 2006

Related U.S. Application Data

(62) Division of application No. 09/986,679, filed on Nov. 9, 2001, now Pat. No. 7,043,496.

(30) Foreign Application Priority Data

Nov. 10, 2000 (JP) .............................. 2000-342743
Mar. 7, 2001 (JP) ................................ 2001-64035

(51) Int. Cl.
*G06F 17/00* (2006.01)
(52) U.S. Cl. ...................... 707/102; 707/100; 707/101; 707/104.1
(58) Field of Classification Search ................ 707/101, 707/102, 104.1
See application file for complete search history.

(56) References Cited

U.S. PATENT DOCUMENTS 5,765,176 A    6/1998  Bloomberg
5,933,498 A    8/1999  Schneck et al.
5,960,194 A    9/1999  Choy et al.
6,772,337 B1 * 8/2004  Yener .......................... 713/165

FOREIGN PATENT DOCUMENTS

| EP | 0671696 A1   | 9/2005  |
|----|--------------|---------|
| JP | 5-197734 A   | 6/1993  |
| JP | 7-64841 A    | 3/1995  |
| JP | 9-16692 A    | 1/1997  |
| JP | 10-233081 A  | 9/1998  |
| JP | 11-149511 A  | 6/1999  |
| JP | 11-232365 A  | 8/1999  |
| JP | 11-272769 A  | 10/1999 |

* cited by examiner

*Primary Examiner*—Sana AL-Hashemi
(74) *Attorney, Agent, or Firm*—Birch, Stewart, Kolasch & Birch, LLP

(57) ABSTRACT

A client unit 1 which a user uses to request for data, an agent unit 2 which keeps encrypted document data and attributes information, a document managing unit 3 which executes user authentication, access control and document image edition by means of decrypting of encrypted document data each have a processing function and an interface function which are independent of each other, and are connected via a communication network. This realizes a new data managing method which makes it easy to retrieve document data from a database through an on-line use or to search, output and otherwise document data in a single computer system, and therefore, a high level of security is achieved.

2 Claims, 17 Drawing Sheets

DATA MANAGING METHOD, DATA MANAGING SYSTEM, DATA MANAGING APPARATUS, DATA HANDLING APPARATUS, COMPUTER PROGRAM, AND RECORDING MEDIUM

This application is a Divisional of application Ser. No. 09/986,679, filed on Nov. 9, 2001, now U.S. Pat. No. 7,043,496 the entire contents of which is hereby incorporated by reference and for which priority is claimed under 35 U.S.C. § 120.

BACKGROUND OF THE INVENTION

1. Field of the Invention

The present invention relates to a data managing method of selectively providing data, such as various types of computerized document data, in accordance with requests from a plurality of users and of course one user, a data managing system to which this method is applied, a data managing apparatus and a data handling apparatus which are used in the system, a computer program for realizing these apparatuses, and a recording medium which can be read in a computer and records the computer program, and more particularly, to a data managing method, a data managing system, a data managing apparatus, a data handling apparatus, a computer program and a recording medium which ensure security by means of distributed hardware and realize easy search of data.

2. Description of Related Art

Paperless processing is being promoted for the purpose of reducing a cost related to various types of documents which are outputted using a computer. Such paperless processing uses software (retrieve/edit/output program) for computerizing and storing document data in an electronic storage medium, retrieving for desired document data, and editing and outputting the desired document data, to obtain a document in a desired output format.

Meanwhile, means which utilizes an on-line system is known, for the convenience in an environment that there are more than one users of document data. In other words, as shown in FIG. 1 which is a block diagram of an example of a conventional configuration that a data managing system is structured using a communication network, each electronic terminal (e.g., personal computers in which a predetermined access program is installed and which comprise a processor 011, a memory 012, an input/output circuit 013, a network circuit 014 and the like) 01 of each user of data and a database 03 which is installed in a center for providing data are connected to a communication network 04, respectively. The database (the center) accumulates and manages predetermined document data, and in response to a data request from the electronic terminal 01 of a user connected on-line, edits and processes data into a requested format (which is determined in advance) and outputs as a displayed image on the terminal of this user.

Also known is data managing means in which, as shown in FIG. 2 which is a block diagram of an example of a conventional configuration that a data managing system is realized by a signal computer system in stead of using such an on-line system above, document data which users need are stored in electronic storage mediums 02 for the respective users as printed images of document outputs and the electronic storage mediums 02 are distributed to the users so that the users, using their own electronic terminals 01, retrieve necessary data from the electronic storage mediums.

However, a conventional on-line system, in many cases, use a scheme that control of accesses from users is incorporated in a data managing system itself which is installed in a center. Due to this, the data managing system requires not only a system introducing expenditure of software cost, such as a database engine, and hardware cost but also an operation cost. In addition, as data accumulated in a database increases, a management cost of the database, a management cost of related software, a support cost and an operation cost increase.

An approach generally used for cost reduction is a method which demands to save less frequently used data on a magnetic tape or the like after a certain period of time and accordingly delete the data from a database. To refer to the data thus saved in the magnetic tape or the like, it is necessary to retrieve the data from the medium which holds the data, which is complex work.

Further, upon revision of a legal system, a managing system or the like users comply, the system needs be modified. Depending on a modification to the system, it becomes impossible to import data in a simple manner. This, when added to management of software such as a related program, demands an enormous cost in general. Another complex work is also necessary since the problem above needs be solved by printing documents on papers, saving on a COM film for a COM (Computer Output Microfilm) system, computerizing the printed images of the documents, etc.

Besides, data security management in such an on-line system described above is inevitably necessary, which leads to a necessity to take an action to prevent anyone from taking out document data to outside. Of course, security management has been already in place, but not to a sufficient extent.

Furthermore, although the data managing means above which does not use an on-line system is convenient to users in that the users can always refer to data and output documents, since a specialized dedicated system, e.g., identical hardware used by users, is sometimes necessary, this configuration can not be regarded well generalized.

On top of this, since users are in charge of management of electronic recording mediums, a program for browsing data and the like, there is a problem with respect to security management.

BRIEF SUMMARY OF THE INVENTION

The present invention has been made in view of such a circumstance. Accordingly, the primary object of the present invention is to provide a data managing method which isolates a function of managing the recording states of recorded data and a function of handling data such as accesses to the data recorded in recording means such as a CD-ROM and a hard disk, sends back recording location information, which indicates the recording locations of the data recorded in the recording means, to data managing means (a document managing unit) which has a function of managing the recording states of data from data handling means (an agent unit) which has a function of handling data, and allows the data managing means to dynamically manage the recording locations of data based on the received recording location information, to thereby make it easy to manage and retrieve data, a data managing system to which this method is applied, a data managing apparatus and a data handling apparatus which are used in the system, a computer program for realizing these apparatuses, and a recording medium in which such a computer program is saved.

Another object of the present invention is to provide a data managing system or the like in which data are recorded after encrypted and data managing means decrypts the data to thereby realize a high level of security.

A data managing method according to the first invention is a data managing method for management of data, including extraction of recorded data, in accordance with a request from a user, characterized in that the method uses data handling means which handles the recorded data and data managing means which is connected with the data handling means and manages the recording states of the recorded data, the data handling means passes the data managing means with recording location information which is indicative of the recording locations of the recorded data, and the data managing means saves the passed recording location information, retrieves the recording location of requested data from the saved recording location information in response to a request from a user, and extracts data through the data handling means based on the retrieved recording location.

With the data managing method according to the first invention, recording states of data are dynamically managed based on the recording location information received from the data handling means, and therefore, the data handling means and the data managing means can independently operate. Hence, the data managing means manages only entry and retrieval of data. When data increases, it is only necessary to add another data handling means and add a management program only for the additional data handling means to the data managing means. This therefore makes it easy to manage and retrieve data and makes it possible to reduce complex work and realize a system which is easily applied to an on-line system and is excellently generalized.

In other words, as data themselves are isolated from the data managing means, formed by a software program for instance, which manages conversion formats for data which are needed to output the data, it is possible to manage the data themselves on removable mediums and accordingly isolate the data from a system which is formed by a group of apparatuses. Because of this, it is not necessary to develop a special system, such as a redundant configuration, which is used just in case data are saved during a system failure in a conventional system wherein data and conversion formats for outputting the data are managed in the same apparatus, and it is possible to build an inexpensive system using personal computers, for instance. Further, since various types of data outputs are realized only by changing a conversion format for outputting which is managed by the data managing means, it is possible to largely reduce work and time associated with the format change, easily realize common sharing of data and decrease various costs including a labor cost.

A data managing system according to a second invention is characterized by comprising: a client unit which a user uses to request for data; an agent unit which saves encrypted document data and attributes information; a document managing unit which executes user authentication, access control and document image edition by means of decrypting of encrypted document data; wherein each the unit has a processing function and an interface function which are independent of each other, and are connected via a communication network.

A data managing system according to a third invention is characterized in that the client unit and the agent unit which saves document data used by a user of the client unit are housed in a user terminal, and the document managing unit is disposed at a different location which is on-line connected.

A data managing system according to a fourth invention is, in the second invention, characterized in that when document data have an output image in which a plurality of lines of particulars data are described between a predetermined page header and page footer, a necessary multi-layer hierarchical index file is constructed which contains a lowest-order index file formed by the page header, the page footer and storing location data of the particulars data, a higher-order index file formed by index keys, index items and the storing location data of the lowest-order index file by blocking the lowest-order index file, and a further higher-order index file formed by blocking the upper index file, and in response to a data request from the client unit, lower-order index files are sequentially specified from the higher-order index file by means of transactions between the client unit and the document managing unit, whereby data requested by a user are specified and provided.

In the data managing systems according to the second invention through the fourth invention, as a browsing request is made by designating the type of desired document data from the client unit (user electronic terminal) to the document managing unit, the document managing unit checks the qualification of a user, specifies the storage location of the requested data, retrieves and decrypts the requested data from the predetermined agent unit, and sends to the client unit in a requested output form. Thus, the document managing unit manages only retrieval and entry of data and document data are stored as they are encrypted independently in the agent unit. Therefore, it is possible to deal with an increase in document data by means of expansion of the agent unit and it is only necessary to add a management program for the expansion alone to the document managing unit. Further, since the agent unit which is a place where the data are stored, the data are saved as they are encrypted in an electronic recording medium, effective security management is realized.

A data managing system according to a fifth invention comprises a data handling mechanism for handling recorded data, a terminal mechanism for requesting for outputting of data recorded in the data handling mechanism, a data managing mechanism being connected with the data handling mechanism and for managing the recording states of the recorded data, and manages the data recorded in the data handling mechanism, characterized in that the data handling mechanism comprises means for transmitting to the data managing mechanism recording location information indicative of the recording locations of the recorded data, and the data managing mechanism comprises: means for saving the received recording location information; means for retrieving the recording location of requested data from the saved recording location information in response to a request from the terminal mechanism; means for extracting data through the data handling mechanism based on the retrieved recording location; means for converting the extracted data into a predetermined format set in advance; and means for transmitting to the terminal mechanism the data converted into the predetermined format.

In the data managing system according to the fifth invention, as the data managing mechanism dynamically manages the recording states of data based on the recording location information received from the data handling mechanism which handles data such as data accesses, the data handling mechanism and the data managing mechanism can operate independently of each other. Because of this, the data managing mechanism manages only retrieval and entry of data, and if there is an increase in document data, it is only necessary to expand a database and add a management program for the expansion alone to the document managing mechanism. Hence, it is easy to manage and retrieve data and it is possible to reduce complex work.

A data managing system according to a sixth invention comprises a terminal mechanism for outputting data of an image format and a data managing mechanism for supporting management of data by the terminal mechanism, and manages data recorded in the terminal mechanism characterized in that the terminal mechanism comprises means for transmitting to the data managing mechanism recorded data and format information indicative of an image format at outputting of the data; and the data managing mechanism comprises: means for converting received data into an image format expressed by the received format information; and means for transmitting the data converted into the image format to the terminal mechanism.

In the data managing system according to the sixth invention, the terminal mechanism which outputs data is independent of the data managing mechanism which converts into the image format which is for outputting in the terminal mechanism. Since this makes it easy to execute work such as expansion of a database and the terminal mechanism alone can not obtain image format data, it is possible to enhance the security of data.

A data managing system according to a seventh invention is characterized in that in the fifth or the sixth invention, the data are encrypted, and the data managing mechanism further comprises means for decrypting encrypted data.

In the data managing system according to the seventh invention, a high level of security is realized by means of application of an encryption technique. Since the data managing mechanism, not the terminal mechanism, performs decrypting, it is possible to realize an even higher level of security.

A data managing system according to an eighth invention is characterized in that in the fifth or the seventh invention, the data managing mechanism further comprises: means for authenticating the terminal mechanism; and means for restricting processing on the data handling mechanism based on an authentication result.

In the data managing system according to the eighth invention, an access to data is restricted based on the authentication processing, it is possible to realize a high level of security.

A data managing apparatus according to a ninth invention is a data managing apparatus which manages the recording states of recorded data, characterized by comprising: means for receiving recording location information indicative of the recording locations of the recorded data; means for saving the received recording location information; means for retrieving the recording location of requested data from the saved recording location information when data output is requested; means for extracting data based on the searched recording location; and means for converting extracted data into a predetermined format set in advance.

The data managing apparatus according to the ninth invention dynamically manages the recording states of data based on the recording location information received from the data handling apparatus which handles data such as data accesses. The data managing apparatus is isolated from the mechanism which handles data, and therefore, manages only retrieval and entry of the data. When there is an increase in document data, the apparatus which handles data may be additionally disposed and a management program for the expansion alone may be added, and therefore, it is easy to manage and retrieve data and it is possible to reduce complex work.

A data handling apparatus according to a tenth invention is a data handling apparatus which handles recorded data, characterized by comprising: means for transmitting recording location information indicative of the recording locations of the recorded data to a data managing apparatus which manages the recording states of the recorded data; and means for transmitting requested data when receiving from the data managing apparatus a data send request based on a recording location.

The data handling apparatus according to the tenth invention transmits the recording location information to the data managing apparatus, causes the data managing apparatus to dynamically manage the recording states of data, and is independent of the data managing apparatus. Hence, it is easy to manage and retrieve data and it is possible to reduce complex work.

A computer program according to an eleventh invention is a computer program which causes a computer to manage the recording states of recorded data, characterized by comprising following procedures of: when receiving recording location information indicative of the recording locations of the recorded data, causing a computer to save the received recording location information; when being requested outputting of data, causing a computer to retrieve the recording location of requested data from the saved recording location information; causing a computer to extract data based on the retrieved recording location; and causing a computer to convert extracted data into a predetermined format set in advance.

As a computer runs the computer program according to the eleventh invention, the computer serves as a data managing apparatus. The data managing apparatus dynamically manages the recording states of data based on the recording location information received from a data handling apparatus which handles data such as data accesses, and the data managing apparatus is independent of the mechanism which handles the data, and therefore, the data managing apparatus manages only retrieval and entry of the data. Owing to this, when there is an increase in document data, the mechanism which handles data may be additionally disposed and a management program for the expansion alone may be added, and therefore, it is easy to manage and retrieve data and it is possible to reduce complex work.

A computer program according to a twelfth invention is a computer program which causes a computer to handle recorded data, characterized by comprising following procedures of: causing a computer to transmit recording location information indicative of the recording locations of the recorded data to a data managing apparatus which manages the recording states of the recorded data; and when receiving a data send request based on a recording location, causing a computer to transmit requested data from a data apparatus.

As a computer runs the computer program according to the twelfth invention, the computer serves as a data handling apparatus. The data handling apparatus transmits the recording location information to the data managing apparatus, the data handling apparatus causes the data managing apparatus to dynamically manage the recording states of data and the data handling apparatus is independent of the data managing apparatus, and therefore, it is easy to manage and retrieve data and it is possible to reduce complex work.

A computer readable recording medium according to a thirteenth invention is a recording medium which records a computer program for causing a computer to manage the recording states of recorded data, characterized by comprising following procedures of: when receiving recording location information indicative of the recording locations of the recorded data, causing a computer to save the received recording location information; when being requested outputting of data, causing a computer to retrieve the recording location of requested data from the saved recording location information; causing a computer to extract data based on the retrieved recording location; and causing a computer to convert extracted data into a predetermined format set in advance.

As a computer executes a program recorded on the computer readable recording medium according to the thirteenth invention, the computer serves as a data managing apparatus. The data managing apparatus dynamically manages the recording states of data based on the recording location information received from a data handling apparatus which handles data such as data accesses, and the data managing apparatus is independent of the mechanism which handles the data, and therefore, the data managing apparatus manages only retrieval and entry of the data. Owing to this, when there is an increase in document data, the mechanism which handles data may be additionally disposed and a management program for the expansion alone may be added, and therefore, it is easy to manage and retrieve data and it is possible to reduce complex work.

A computer readable recording medium according to a fourteenth invention is a recording medium which records a computer program for causing a computer to handle recorded data, characterized by comprising: program code means for causing a computer to transmit recording location information indicative of the recording locations of the recorded data to a data managing apparatus which manages the recording states of the recorded data; and program code means for, when a data send request based on a recording location is received, causing a computer to transmit requested data.

As a computer executes a program recorded on the computer readable recording medium according to the fourteenth invention, the computer serves as a data handling apparatus. The data handling apparatus transmits the recording location information to the data managing apparatus, the data handling apparatus causes the data managing apparatus to dynamically manage the recording states of data and the data handling apparatus is independent of the data managing apparatus. Therefore, it is easy to manage and retrieve data and it is possible to reduce complex work.

The above and further objects and features of the invention will more fully be apparent from the following detailed description with accompanying drawings.

DETAILED DESCRIPTION OF THE INVENTION

In the following, the present invention will be described with reference to drawings which show preferred embodiments of the present invention.

First Preferred Embodiment

Figure 1:
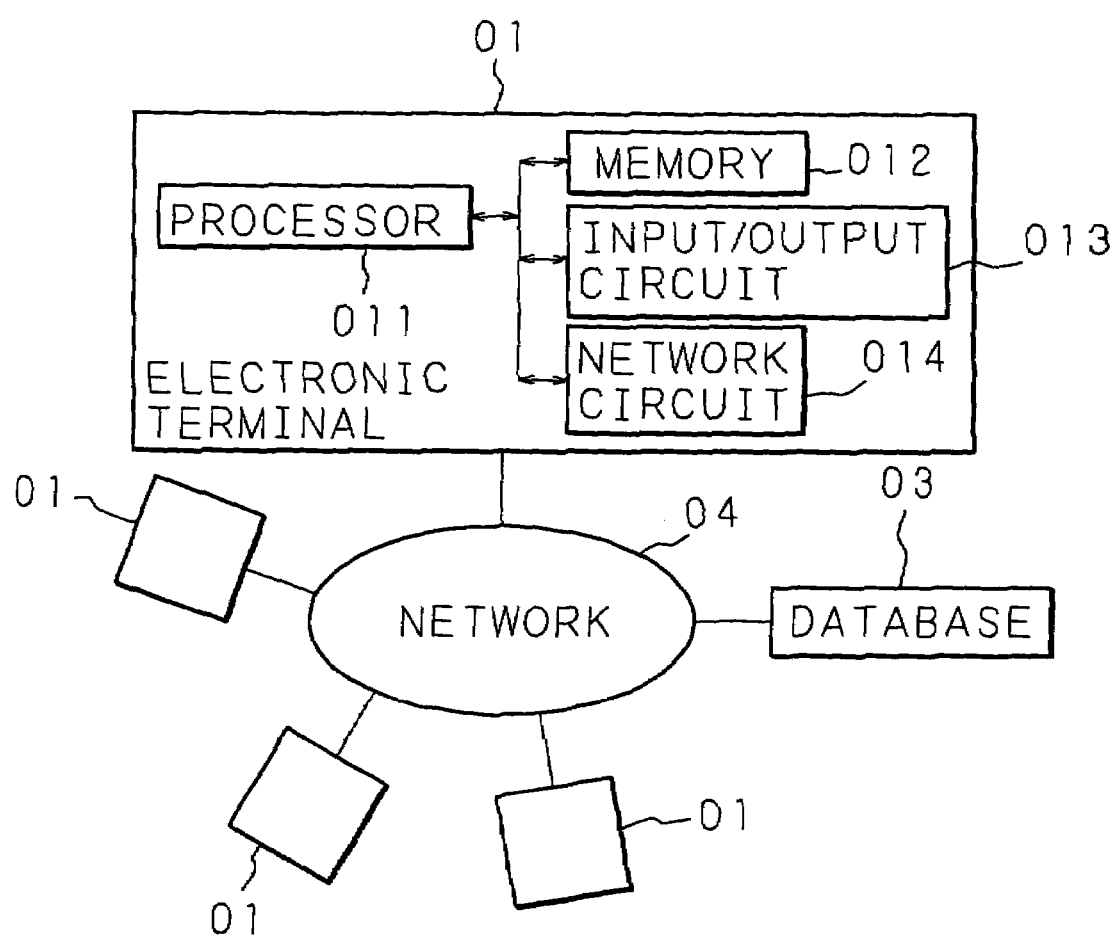
FIG. 1 is a block diagram showing an example of a conventional configuration that a data managing system is configured using a communication network.
Figure 2:
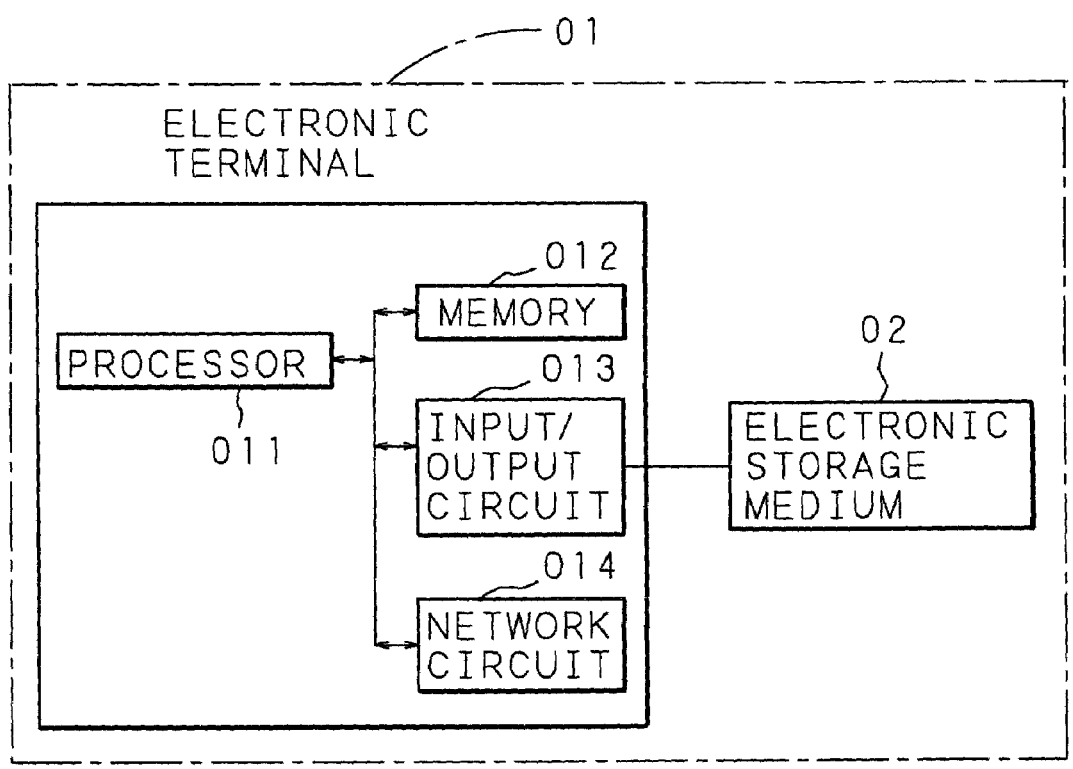
FIG. 2 is a block diagram showing an example of a conventional configuration that a data managing system is realized by a signal computer system.
Figure 3:
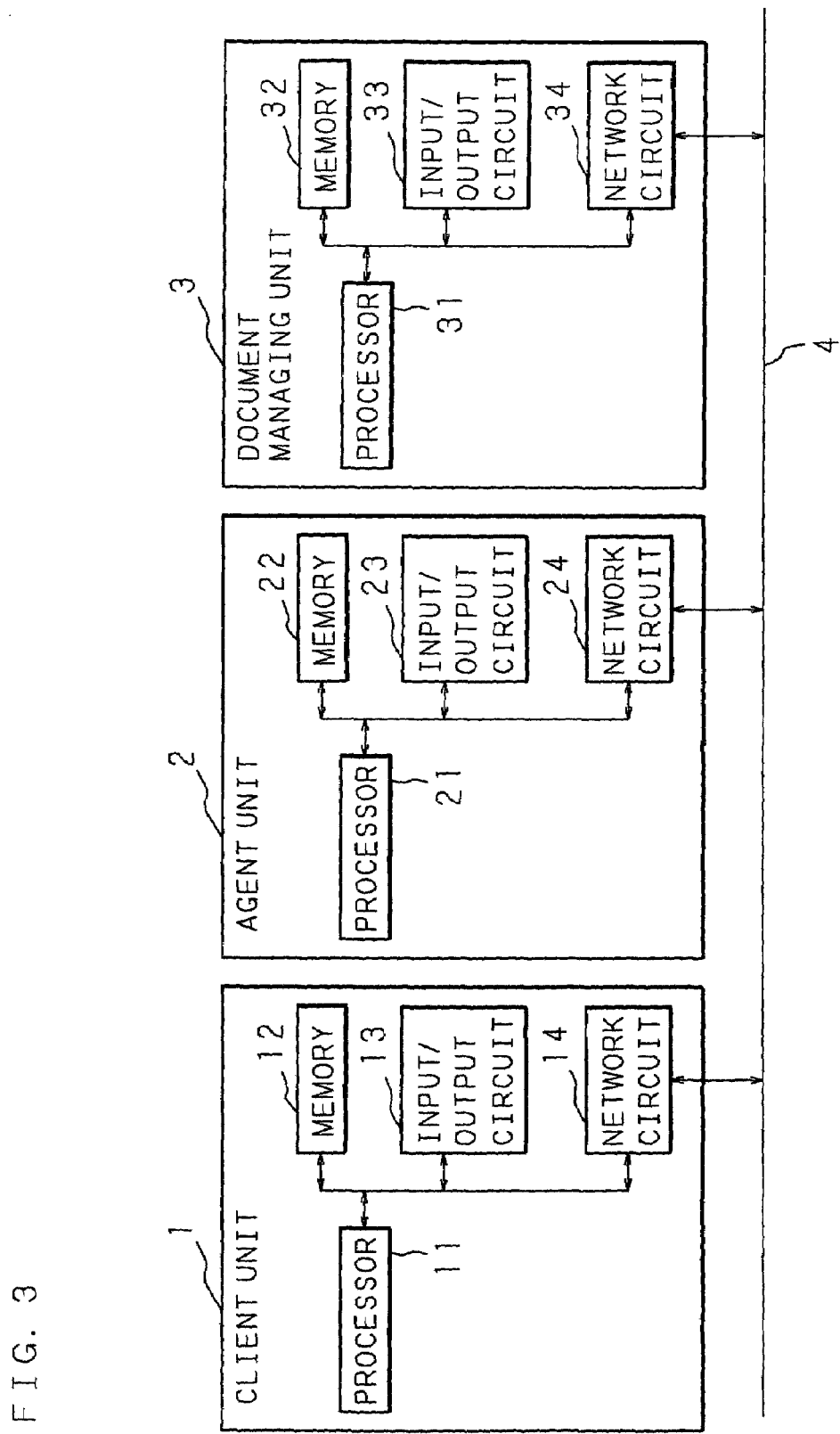
FIG. 3 is a block diagram showing a hardware configuration of a data managing system according to the present invention.
Figure 4:
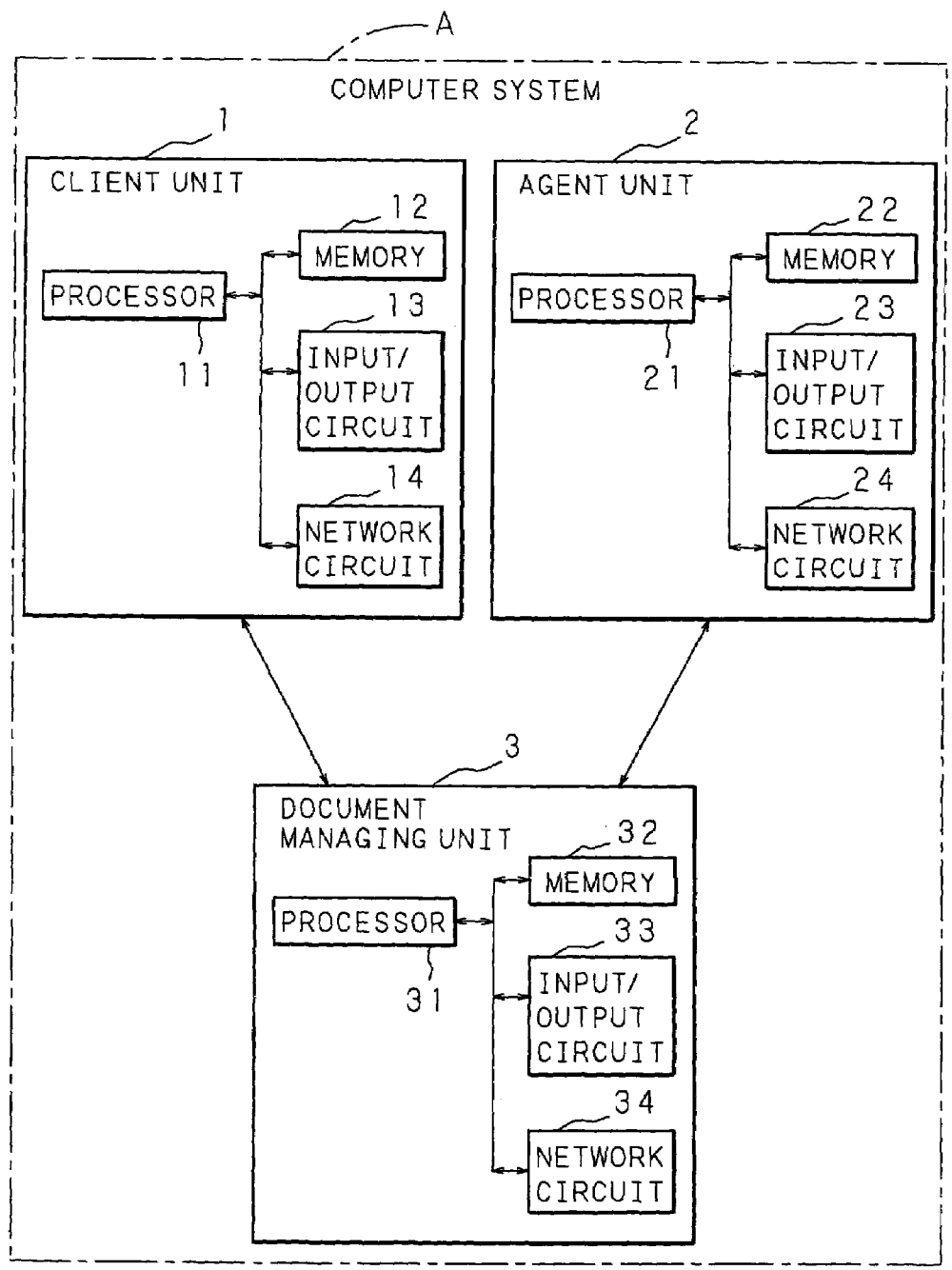
FIG. 4 is a diagram showing a configuration of management in an embodiment in which the data managing system according to the present invention is realized by a signal computer system.
Figure 5A:
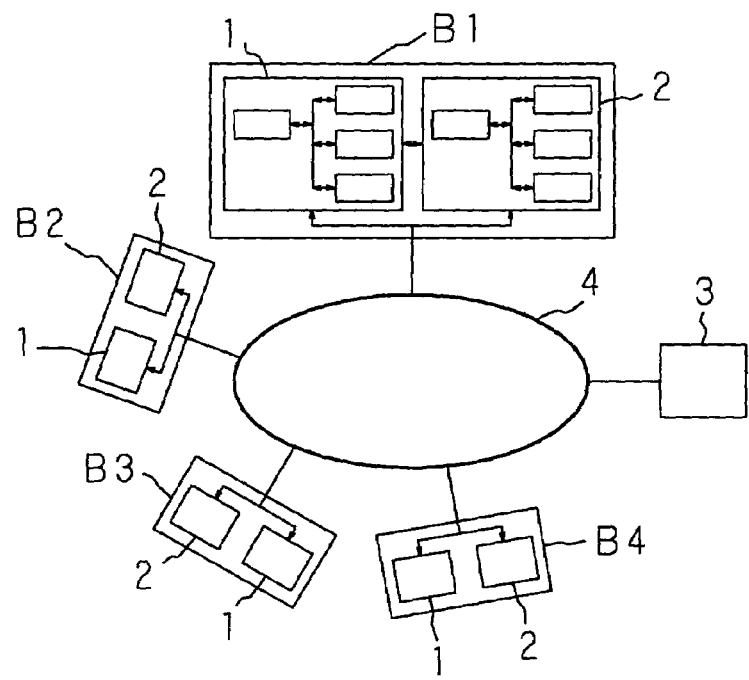
FIGS. 5A and 5B are diagrams showing a configuration of management in an embodiment in which the data managing system according to the present invention is realized by a communication network.
Figure 5B:
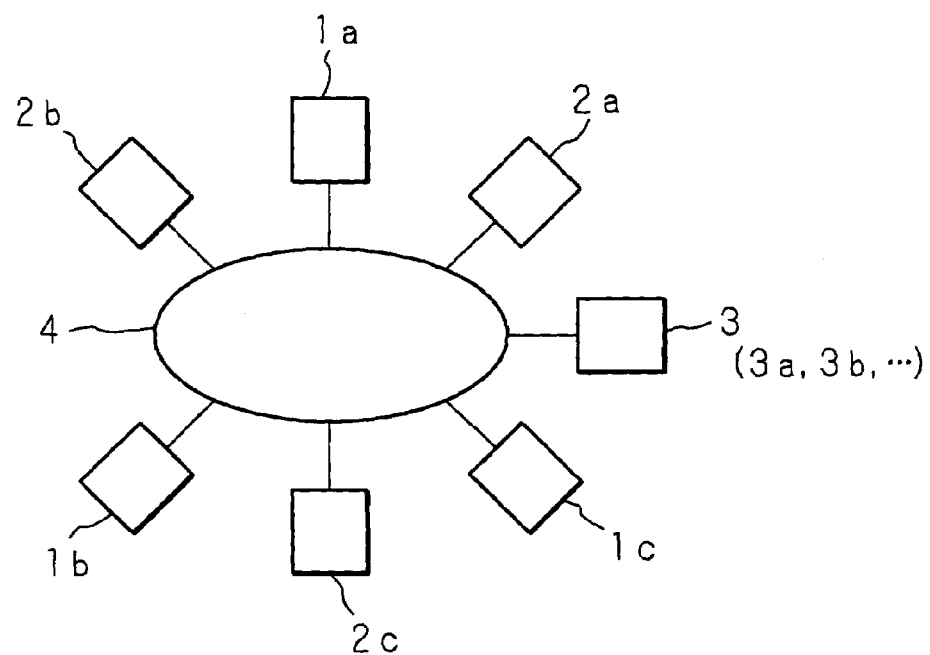
Figure 6:
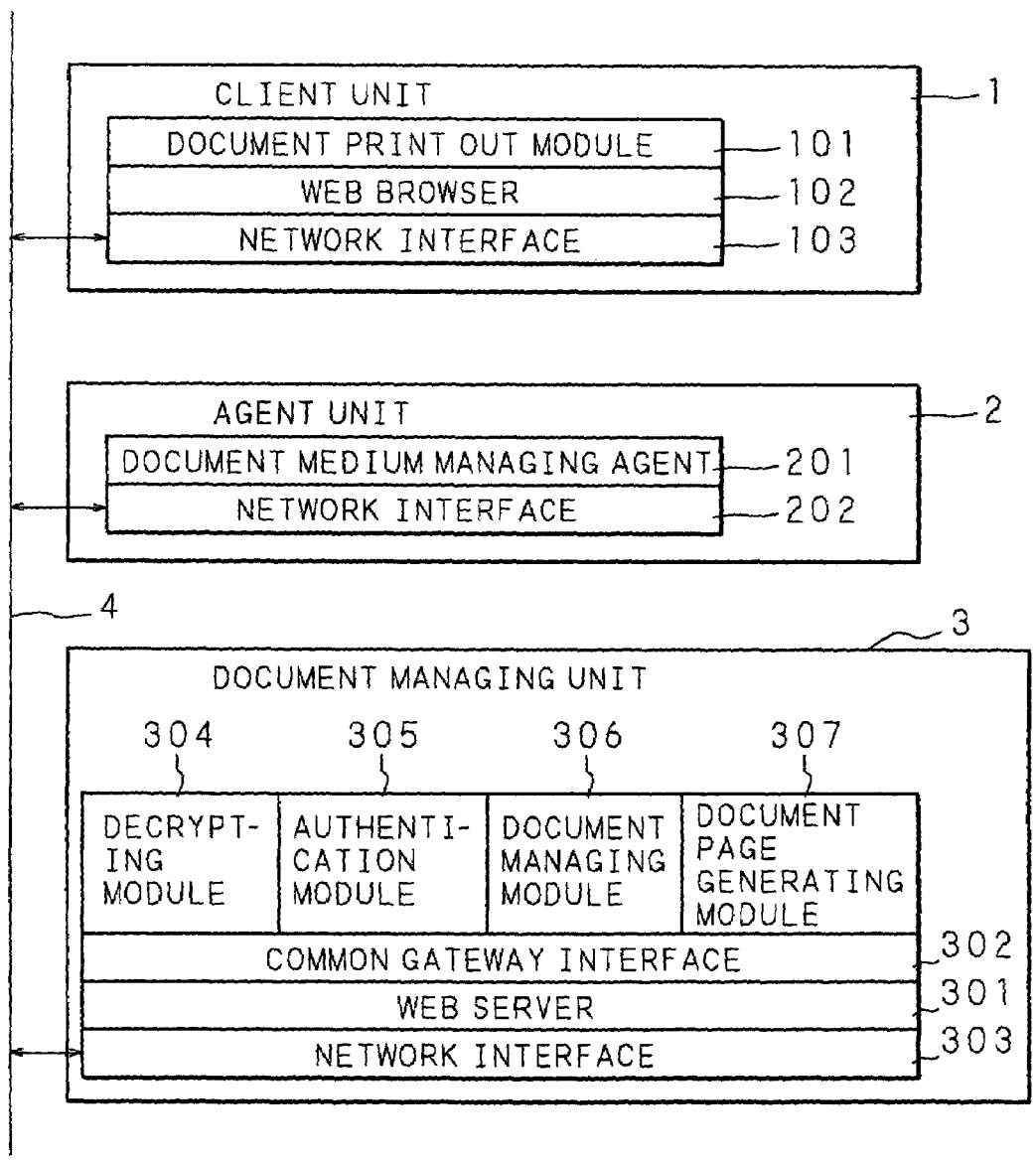
FIG. 6 is an explanatory diagram of a system application in the data managing system according to the present invention.

FIG. 3 is a block diagram showing a hardware configuration of a data managing system according to a first preferred embodiment of the present invention, FIG. 4 is a diagram showing a configuration of management in an embodiment in which the data managing system according to the present invention is realized by a signal computer system, FIG. 5 is a diagram showing a configuration of management in an embodiment in which the data managing system according to the present invention is realized by a communication network, and FIG. 6 is an explanatory diagram of a system application in the data managing system according to the present invention.

In the data managing system according to the present invention, a client unit 1 (terminal mechanisms) used by users for requesting data, an agent unit 2 (data handling mechanism) in which document data and the like are stored and a document managing unit 3 (data managing mechanism) for data management each have a processing function and an interface function which are independent of each other as shown in FIG. 3, and these units are connected via a communication network 4 (communication path 4). This is a configuration that the respective units 1, 2 and 3 are incorporated in a single computer system A as shown in FIG. 4, a configuration that the client unit 1 and the agent unit 2 are incorporated in user terminals B1, B2, B3, B4, ... while the document managing unit 3 remains independent as shown in FIG. 5A, or a configuration that a plurality of user terminals (client units) 1a, 1b, 1c, ..., a plurality of agent units 2a, 2b, 2c, ..., and one or a plurality of document managing units 3a, 3b, ... for managing the plurality of agent units 2a, 2b, 2c, ... are connected with each other as shown in FIG. 5B.

A user uses the client unit 1 for the purpose of notifying the document managing unit 3 of a document browsing request and receiving desired document data. Functions the client unit 1 must have are a web browser 102 for providing a user interface, a document print out module 101 for controlling printing of a document having complex layout, and a network interface 103 for communications with the agent unit 2, the document managing unit 3 and the like. The document print out module 101 is not indispensable but may be omitted where a printing function employed within the web browser 102 is enough. The document print out module 101 is installed when the printing function employed in the web browser 102 causes an inconvenience.

Hardware of the client unit 1 for exhibiting the functions described above includes, like known electronic terminals, a processor 11, a memory 12, an input/output circuit 13 and a network circuit 14 which enables communications via the communication path 4. The processor 11 is used to run the web browser 102 and control an input/output apparatus which is connected to the input/output circuit 13.

The agent unit 2 comprises a document medium managing agent 201 and a network interface 202, and in response to a request from the document managing unit 3, sends to the document managing unit 3 document data on a computer system in which the agent unit 2 itself is installed. The document data are those recorded in a recording apparatus which is incorporated in the computer system which mounts the agent unit 2 or those saved on a removable medium and the like.

The document medium managing agent 201 is installed as a file manager, or serves to a purpose of autonomously detecting electronic document data and notifying the document managing unit 3. In the former case, under the control of the client unit 1 or the document managing unit 3, the document medium managing agent 201 acts as a go-between with a file system in which electronic document data are recorded, while electronic document data are detected under the control of the client unit 1 or the document managing unit 3. In the latter case, the document medium managing agent 201 autonomously detects electronic document data and notifies the document managing unit 3.

Hardware the agent unit 2 must have is a processor 21, a memory 22, an input/output circuit 23 and a network circuit 24 which enables communications via the communication path 4. Via the input/output circuit 23, the processor 21 executes software (document medium managing agent 201) which manages electronic document data (which are formed by a "document catalogue" and "document data", the "document catalogue" being formed by "document type information" and "security information").

Further, the processor 21 acquires a document catalogue through the input/output circuit 23, executes software for sending the document catalogue to the document managing unit 3 via the communication path 4, and executes software for retrieving document data from the input/output circuit (electronic recording mediums connected to the circuit) 23 in response to a document data request from the communication path 4 and for sending the data to the communication path 4. The memory 22 is used as a temporary data storage or the like for the software executed by the agent unit 2.

The document managing unit 3 manages recording states which indicate, for example, what type of document data exist in the agent unit 2, and as a document browsing request is received from the client unit 1, retrieves the requested document data via the agent unit 2 after authenticating a user and sends the data to the client unit 1. Document data managed by the agent unit 2, in particular, are encrypted in advance, and therefore, such document data are edited into a document image in the document managing unit 3 after decrypted in the document managing unit 3 and the edited document image is sent to the client unit 1.

The document managing unit 3 is configured by a web server 301, a common gateway interface 302, a network interface 303, a decrypting module 304, an authentication module 305, a document managing module 306 and a document page generating module 307. The web server 301 is for sending and receiving an HTTP command to and from the client unit 1 on the communication path 4. The web server 301 accepts an HTTP command from the client unit 1 and invokes functions of the decrypting module 304, the authentication module 305, the document managing module 306 and the document page generating module 307 through the common gateway interface 302. The authentication module 305 performs user authentication and session management of the client unit 1 which makes access. The document managing module 306 collects from the agent unit 2 a document catalogue managed by the agent unit 2, maintains the document catalogue database and generally manages which agent unit 2 manages which document data.

The decrypting module 304 encrypts document data retrieved from the agent unit 2. The document page generating module 307 generates HTML or XML for response to the client unit 1. Further, the document page generating module 307 has a function of editing document data retrieved from the agent unit 2 into HTML or XML. 47 Hardware the document managing unit 3 must have for exhibiting the function described above includes a processor 31, a memory 32, an input/output circuit 33 and a network circuit 34 which enables communications via the communication path 4. The processor 31 runs software for generating document images, software for decrypting encrypted document data, software for authenticating users, software for managing sessions of users and software for collecting and managing a document catalogue. The software executed by the document managing unit 3 and document layout information are saved in an apparatus which is connected with the input/output circuit 33. The memory 32 is used as a temporary data storage area for the software executed by the document managing unit 3, and used also for the purpose of editing document data retrieved from the agent unit 2 into HTML or XML.

The communication path 4 is realized by various communication mechanisms such as a local area network, telephone lines including cellular telephone links, a serial communication link, a parallel communication link, a power-line communication link, a radio communication link, infrared data communication link, etc.

In addition, communications between the client unit 1 and the document managing unit 3 is performs with each other through the hyper text transfer protocol (HTTP), and communications between the agent unit 2 and the document managing unit 3 and communications between the client unit 1 and the document managing unit 3 are not limited to HTTP.

Next, operations in an embodiment using the configuration as described above will be described. Since a user requests the document managing unit 3 to display an initial menu view through the web browser 102 of the client unit 1, a predetermined universal resource locator (URL) is designated and an HTTP command is sent to the document managing unit 3 via the network interface 103. The document managing unit 3 transmits an initial menu to the client unit 1 via the communication path 4. The menu is built as a hierarchical form so that a user selects a menu for operations.

As to the structure of information, as described earlier, the "electronic document data" held in the agent unit 2 are "document catalogue" and "document data," and "document catalogue" is formed by "document type information" and "security information". The "document type information" expresses what type of document are computerized into the electronic document data. As the document type information which specifies the electronic document data is built in a hierarchical form as document groups, document sections and document revisions, a process of selecting electronic document data can proceed in a hierarchic manner from a document group to a document sections and further to a document revision.

Hence, while menu selection is requested to an access from the client unit 1 and document data are specified gradually through the hierarchy during which the process gradually proceeds as the menu is specified, the document managing unit 3 generally manages a document catalogue before this. As described above, by the way, one option is to use a configuration which uses autonomous agent units 2 and other option is to use a configuration which uses transitive agent units 2. Autonomous agent units 2 are agent units 2 which autonomously transmit a document catalogue to the document managing unit 3. Such an agent unit 2, detecting document data loaded in the agent unit 2, autonomously sends an associated document catalogue to the document managing unit 3, so that the document managing unit 3 generally manages document catalogues in the document catalogue database which is in the document managing unit 3.

Transitive agent units 2 are such agent units 2 which are used where a third person retrieves a document catalogue and which are installed as a file manager. After the client unit 1, using the function of the agent unit 2 as the file manager function, inquires the location of the document catalogue, the document managing unit 3 is informed of the location of the document catalogue. The document managing unit 3 then retrieves the document catalogue from the agent unit 2 and generally manages the document catalogue in the document catalogue database.

As a user accesses using the client unit 1, as a matter of course the user needs be authenticated. User authentication means, like conventional such means, requests for and transmits an authentication ID. After successful user authentication, a document referring request is transmitted to the document managing unit 3 from the client unit 1, and the document managing unit 3 searches in the document catalogue database, extracts which agent unit 2 manages the corresponding document data and extracts and retrieves the document data from the corresponding agent unit 2. After the document managing unit 3 decrypts the retrieved document data, a document edited and processed as HTML or XML format is transmitted to the client unit 1, whereby the user can obtain the desired document data in a desired format.

In the embodiment described above, a user interface is constructed by the HTML or XML format so that a user can browse edited document data through an ordinary web browser. This not only eliminates a necessity to use a special platform but also allows to flexibly deal with an expansion client, which in turn provides a screen-based interface which is easy for a user to use without a necessity to develop an expensive hardware application and an expensive software application.

Further, as shown in FIGS. 5A and 5B, where electronic document data to be stored in the agent unit 2 are distributed to users, information such as a data structure and the meaning of data is not necessary at all, a data structure and the meaning of data are all generally managed by the document managing unit 3, and it is merely encrypted digital information that is distributed to users. Hence, in order to browse distributed electronic document data, a user needs a document manager which decrypts the encrypted electronic document data and edits the data into a document image. This realizes a dramatically higher level of security than the level of security enabled by conventional encryption of files. In addition, this exponentially reduces a capacity for recording electronic document data.

The document managing unit 3 only needs to have an agent managing function, a function of decrypting document data, a function of editing into a document layout, a user authentication function and a user session managing function. Since the document managing unit 3 does not have to record and hold electronic document data themselves, any special hardware environment is not necessary.

Thus, the system described above solves the proposition regarding document data having high portability and security management which are contradictory to each other, and therefore, it is possible to flexibly deal with a user environment and provide a friendly interface.

Next, a structure of document data which is proper to the data managing system above will be described.

Figure 7:
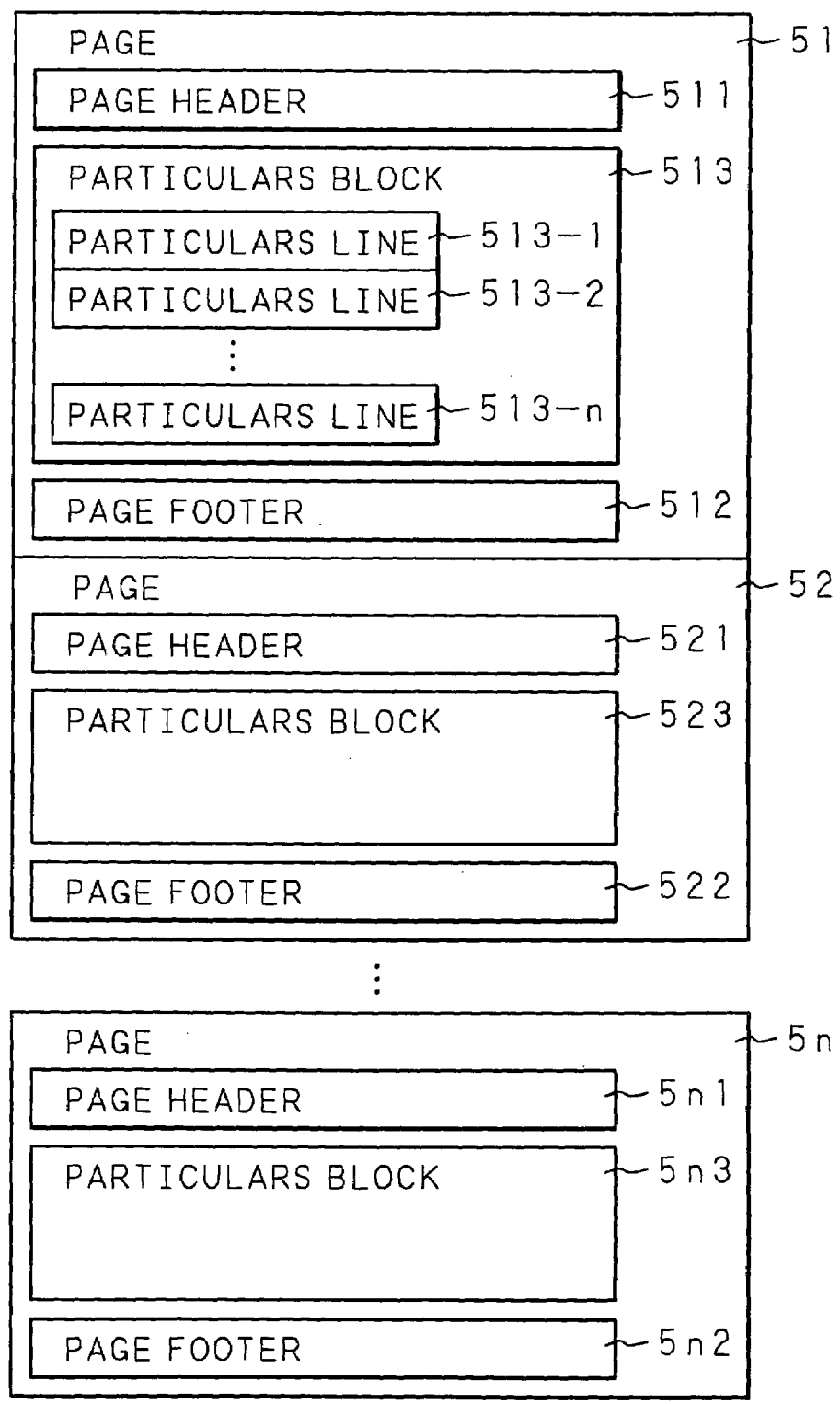
FIG. 7 is an explanatory diagram of a structure of document data in the data managing system according to the present invention.
Figure 8:
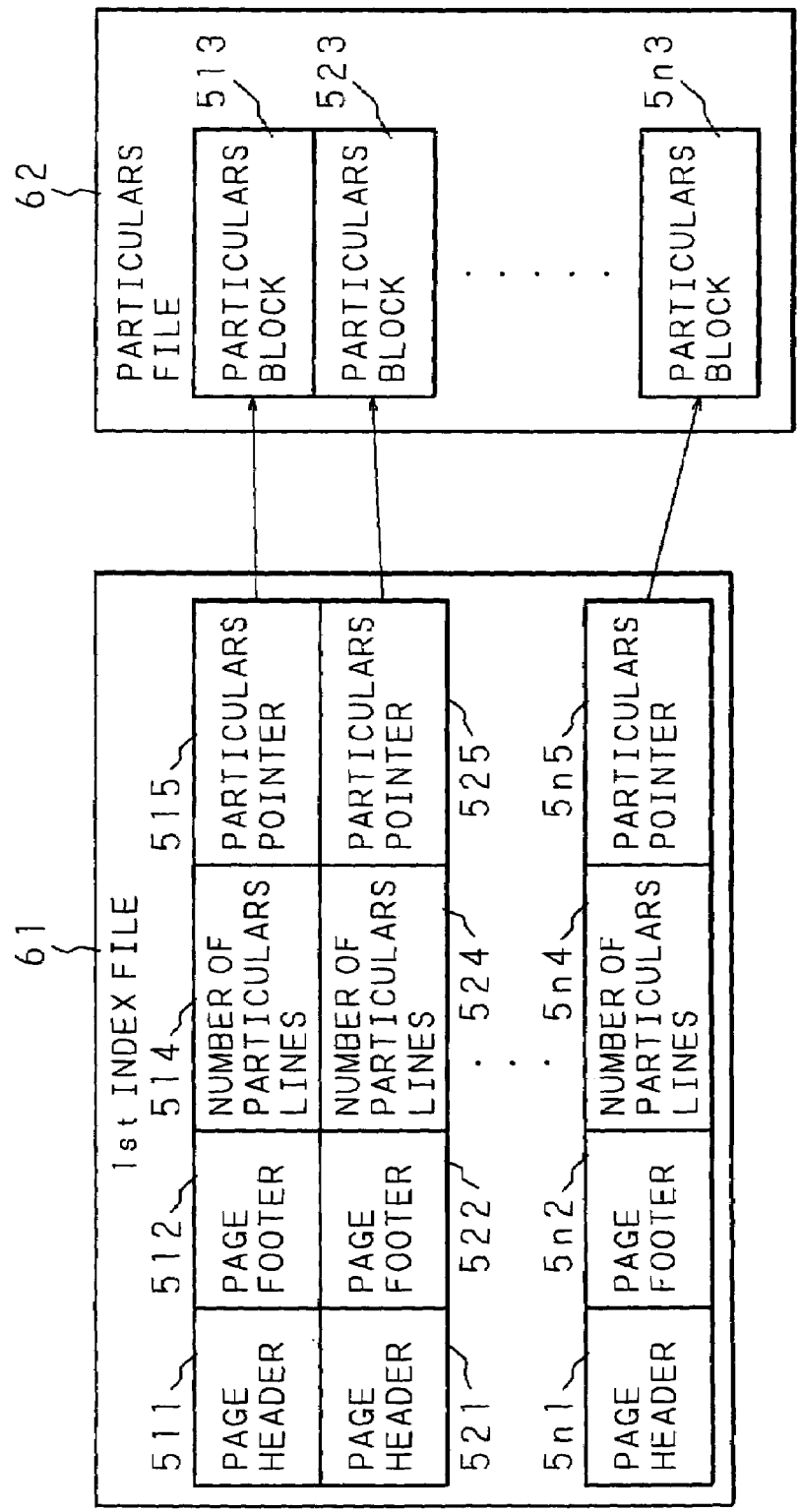
FIG. 8 is an explanatory diagram of a structure of a first index file in the data managing system according to the present invention.
Figure 9:
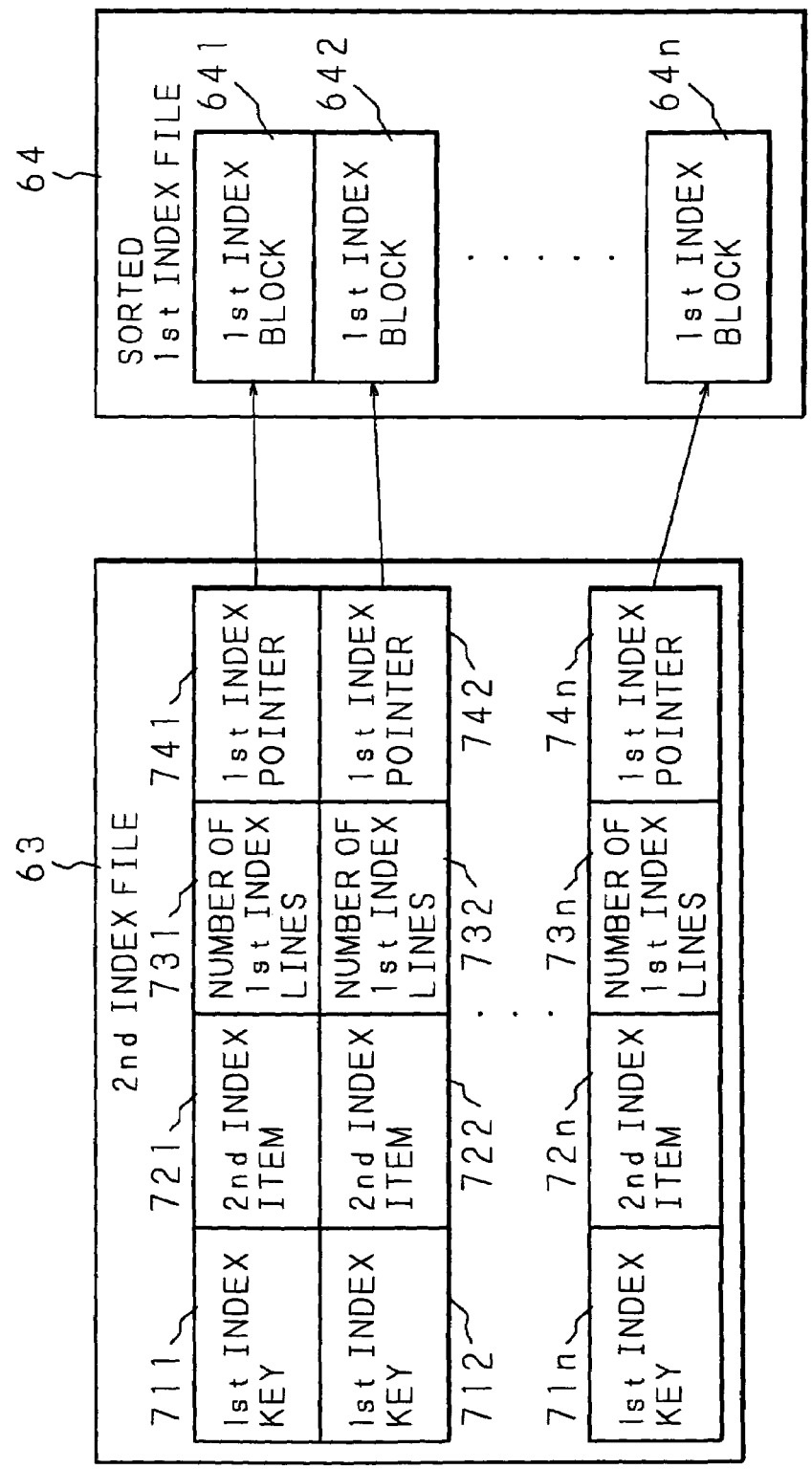
FIG. 9 is an explanatory diagram of a structure of a second index file in the data managing system according to the present invention.
Figure 10:
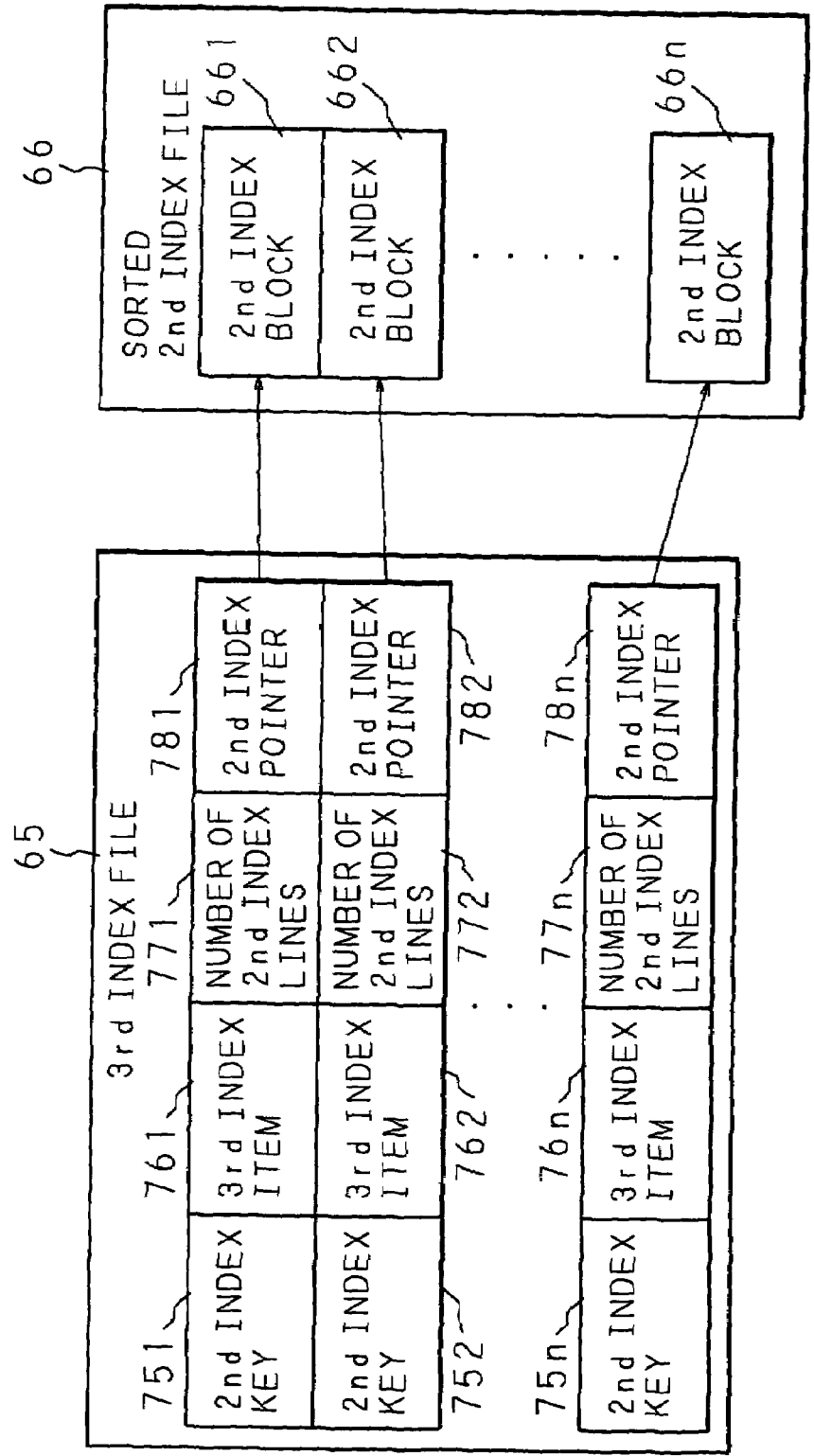
FIG. 10 is an explanatory diagram of a structure of a third index file in the data managing system according to the present invention.

FIG. 7 is an explanatory diagram of a structure of document data which is used in the data managing system according to the first preferred embodiment of the present invention, FIG. 8 is an explanatory diagram of a structure of a first index file, FIG. 9 is an explanatory diagram of a structure of a second index file, and FIG. 10 is an explanatory diagram of a structure of a third index file.

As shown in FIG. 7, a general structure of document data is formed by a plurality of pages 51, 52, . . . , 5*n*. Page 51 is formed by a page header 511, a page footer 512 and a particulars block 513. The particulars block 513 is formed by a plurality of particulars lines 513-1, 513-2, . . . Page 52 is similarly formed by a page header 521, a page footer 522 and a particulars block 523. Documents are sorted in a certain order and outputted, in general. Utilizing this feature, a method of generating an index file will now be described which is used to effectively browse documents in the document data managing system described above.

Noting that there is always information serving as an index item regarding each page in a page header 5×1 and a page footer 5×2 of each page 5× within document data, a first index file 61 is constructed using the page headers 5×1 and the page footers 5×2. Page headers 5×1 and page footers 5×2 of the respective pages are put together in the first index file 61, while particulars blocks 5×3 of the respective pages are put together in a particulars file 62. The particulars file 62 is a combination of the particulars block 513 (523, 533, . . . ) Records in the particulars file 62 correspond to particulars lines. Held in first index records which constitute the first index file 61 are the page headers 5×1, the page footers 5×2, pointers 5×5 to the page footers 5×2 and the particulars blocks 5×3 of the respective pages, and the number of particulars lines 5×4 in each particulars block 5×3.

Further, a higher-order index file is constructed based on the first index file 61. A higher index file (second index file) 63 is formed by grouping a lower index file (first index file 61). A portion of statements (items) described in the page headers 5×1 and the page footers 5×2 in the first index file 61 is grouped as an item group, and the second index file 63 in which the grouped portion is one record is constructed. At the same time, the first index file 61 grouped as the item group mentioned above is brought together as a block (first index blocks 641, 642, . . . ), whereby sorted first index file 64 is obtained.

Second index records in the second index file 63 each have the number of records corresponding to the first index blocks 641, 642, . . . , and describe first index keys 711, 712, . . . which are indicative of item groups in the first index files 61, second index items 721, 722, . . . , the numbers of index lines 731, 732, . . . of the blocked first index blocks, and index pointers 741, 742, to these first index blocks in the sorted first index file 64.

Further, a higher-order index file is constructed based on the second index file 63. In a similar manner to the above, a higher-order index file (third index file 65) is formed by grouping a lower index file (second index file 63), and the second index file 63 is constructed into a sorted second index file 66 which is obtained by grouping into blocks. The grouping is determined using the first index keys 711, 712, . . . and the second index items 721, 722, . . . , and as group indexes, second index keys and third index keys which will be described later are defined.

The third index records in the third index file 65 each have the number of records corresponding to the respective blocks 661, 662, . . . of the sorted second index file 66, and describe second index keys 751, 752, . . . which are indicative of item groups, third index keys 761, 762, . . . , the numbers of index lines 771, 772, . . . of the blocked second index blocks, and index pointers 781, 782, . . . to these second index blocks in the sorted second index file 66. Further, these are partitioned into a multiple of hierarchical layers if necessary, whereby an index file (sorted index file) is constructed.

Figure 11:
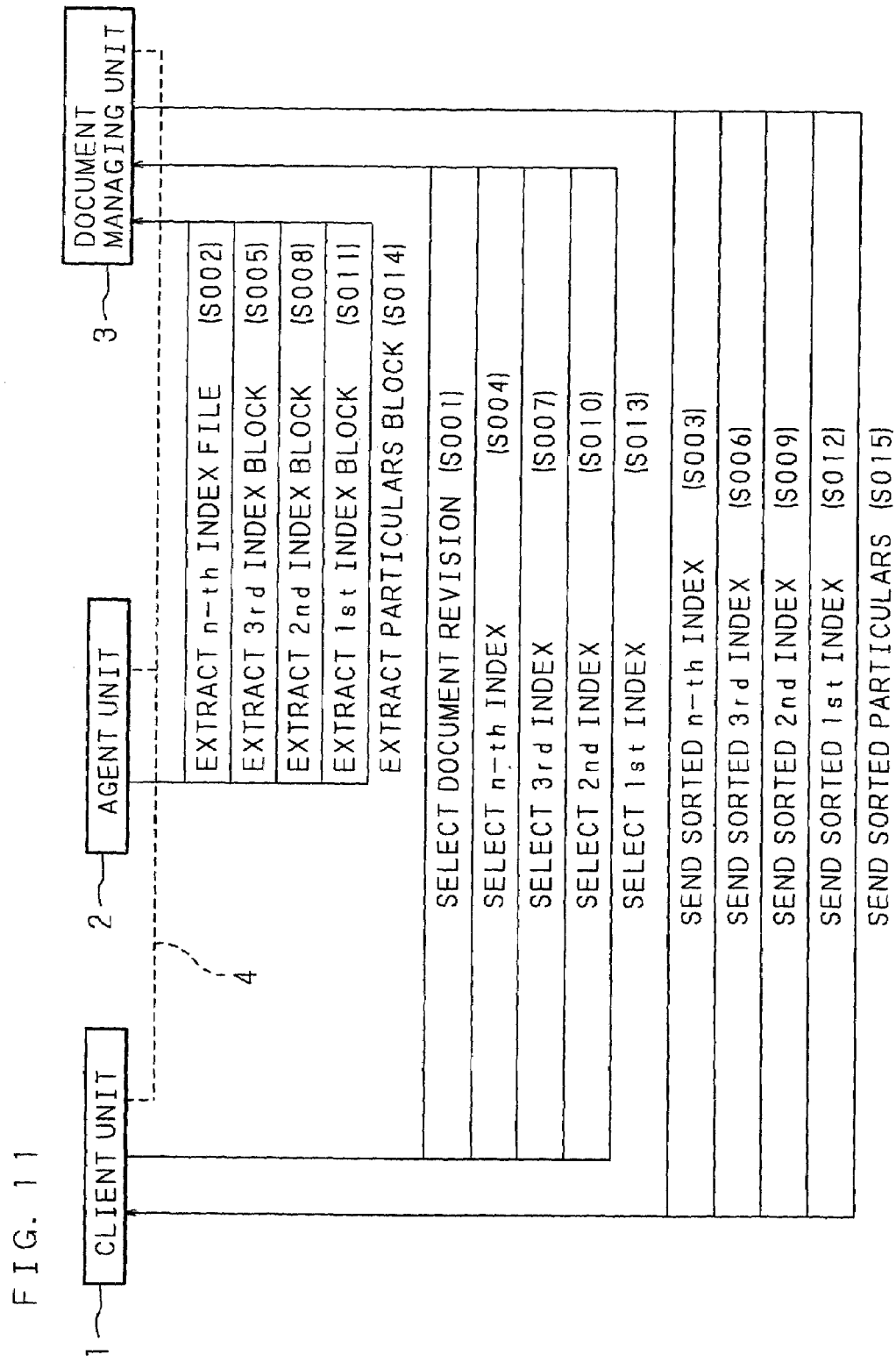
FIG. 11 is a chart showing a process flow which uses an indexing structure of the data managing system according to the present invention.

Now, a description will be given on an example of operations where document data in which such index files above-mentioned are constructed are used in the data managing system described earlier, based on a process flow which uses an indexing structure according to the first preferred embodiment in the data managing system of the present invention which is shown in FIG. 11. After authentication of a user regarding an access from the client unit 1, as a document revision selection (S001) is fed to the document managing unit 3 from the client unit 1, the document managing unit 3 selects the agent unit 2 which manages this document data, and acquires the n-th index file for this document data by extracting the n-th index file from the agent unit 2 (S002). After decrypting the n-th index file, the document managing unit 3 sends the n-th sorted indexes edited as HTML format to the client unit 1 (S003).

The client unit 1 selects one from thus received n-th sorted indexes, and sends the selected n-th index (S004) to the document managing unit 3. The document managing unit 3 acquires a third index block of this document data, through third index block extraction (S005) from the agent unit 2 which manages this document data. After decrypting this third index block, the document managing unit 3 sends the third sorted indexes edited as HTML format to the client unit 1 (S006).

In a similar sequence, third indexes are selected (S007), a second index block is extracted (S008), second sorted indexes are sent (S009), a second index is selected (S010), a first index block is extracted (S011), first sorted indexes are sent (S012), a first index is selected (S013), a particulars block is extracted (S014) and sent and received, and finally, sorted particulars edited as HTML format are sent to the client unit 1 (S015).

Hence, where such a data indexing structure as described above is used, the document managing unit 3 only needs to have a function of authenticating a user, decrypting encrypted document data, managing the agent unit 2 which manages document data, and editing and processing document data acquired from the agent unit 2 as HTML format.

Further, the document managing unit 3, after decrypting a block acquired from the agent unit 2, only needs to edit and process as HTML format, and hence, a load upon the document managing unit 3 is small. Of course, XML format may be used for editing and processing by the document managing unit 3.

Document data are encrypted and decrypted block by block or record by record, and the agent unit 2 only need to manage encrypted document data and send a requested block to the document managing unit 3 in response to requests from the document managing unit 3. Information regarding a requested block sent from the document managing unit 3 to the agent unit 2 is formed by pointer information regarding a pointer to the requested block and the number of records which are continuous to the pointer, and the message length from the document managing unit 3 to the agent unit 2 is as short as a few scores of bytes. In addition, since an operation which the agent unit 2 executes to retrieve the requested block is simple, a load upon the agent unit 2 related to this is small. Moreover, since the message length from the agent unit 2 to the document managing unit 3 is a few kilo bytes (KB), a load upon a network is small.

The client unit 1 may only be a generally available browser which can display HTML format or XML format. Since this requires merely a generally used hardware environment for the browser to operate without any dependence of the client unit 1 on a platform, it is possible to flexibly deal with an expansion. Further, it is only necessary that the client unit 1 and the document managing unit 3 communicate with each other in HTTP on a communication path, and therefore, the client unit 1 and the document managing unit 3 can operate in various networks, such as a local area network, a wide area network and the Internet, regardless of the location of the client unit 1.

Second Preferred Embodiment

While the first preferred embodiment is directed to an example that the data managing system of the present invention is applied to management of documents, the present invention is not limited to this but may be applied to versatile data management. For instance, the present invention is applicable to management of data such as image data and audio data.

Now, as a second preferred embodiment, an example that the data managing system of the present invention is applied to general purpose data management will be described.

The configuration of the system and the hardware are similar to that according to the first preferred embodiment and therefore will not be described. Instead, the configuration of the system and the hardware according to the first preferred embodiment will be referred to. The document managing unit 3 according to the first preferred embodiment, however, should be read as a managing unit 3.

Figure 12:
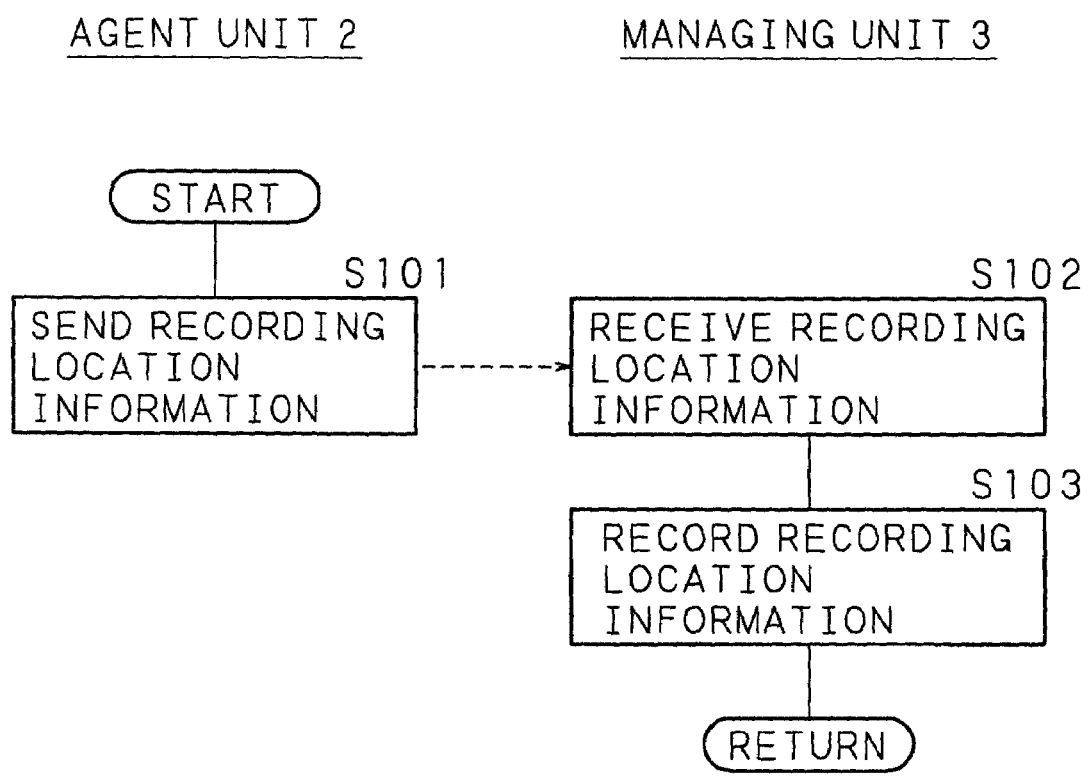
FIG. 12 is a flow chart showing processing of recording location information in the data managing system according to the present invention.

FIG. 12 is a flow chart showing processing of recording location information in the second preferred embodiment of the data managing system according to the present invention.

The agent unit (data handling mechanism) 2, by means of a function which corresponds to the document medium managing agent function 201 according to the first preferred embodiment, sends recording location information which indicates recording locations of data to the managing unit (data managing mechanism) 3 (S101).

The managing unit 3 receives the recording location information (S102) and records the received recording location information (S103).

Figure 13:
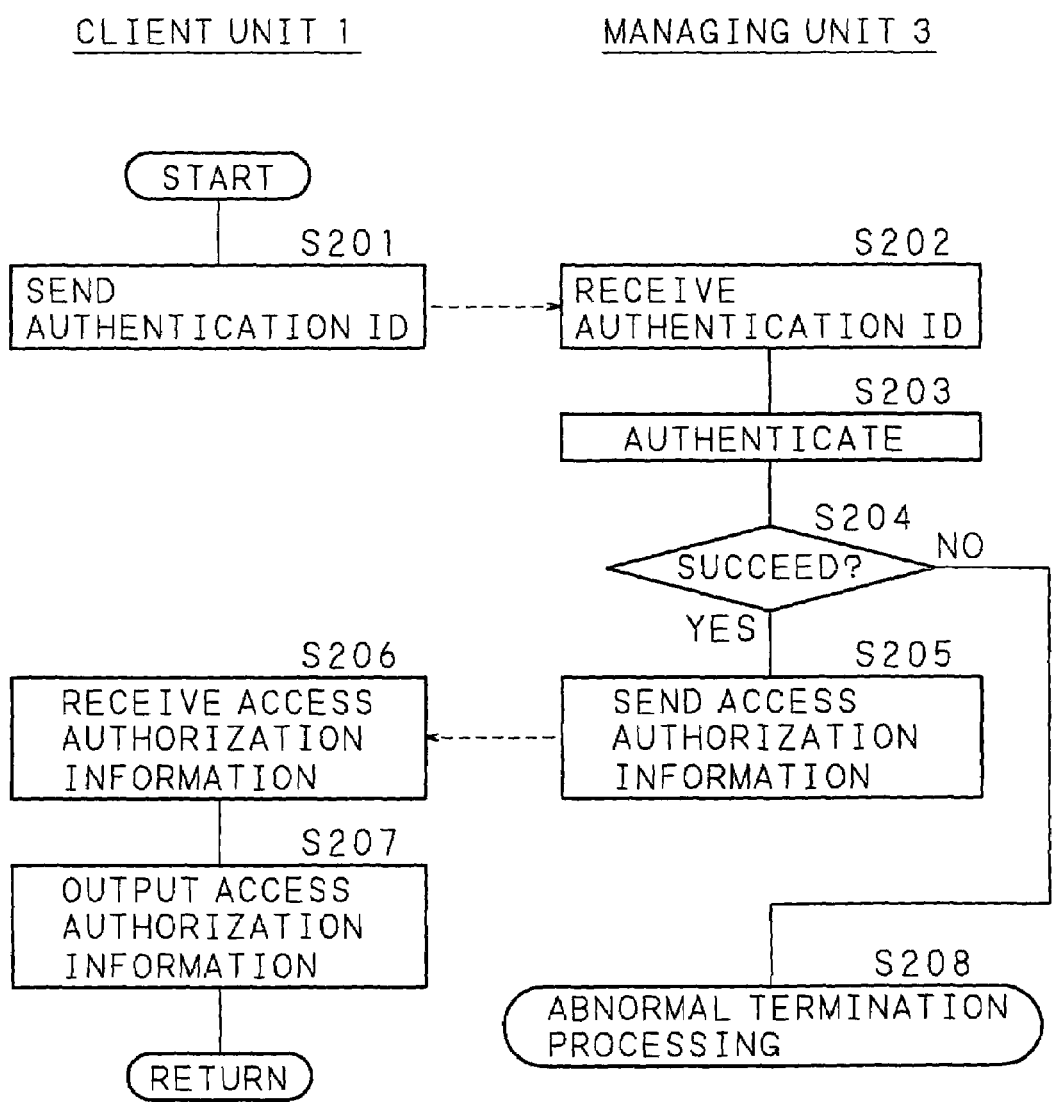
FIG. 13 is a flow chart showing authentication processing in the data managing system according to the present invention.

Next, authentication processing according to the second preferred embodiment in the data managing system of the present invention will be described with reference to the flow chart in FIG. 13.

A user who operates the client unit (terminal mechanism) 1, in order to use the data managing system, executes an operation of sending an authentication ID.

The client unit 1 accepts operation by the user and sends the authentication ID to the managing unit 3 (S201).

The managing unit 3 receives the authentication ID (S202), authenticates the user based on the received authentication ID (S203), and when the user authentication is successful (S204: YES), sends to the client unit 1 access authorization information which permits an access to the agent unit 2 (S205).

The client unit 1 receives the access authorization information (S206), outputs the received access authorization information (S207), and makes the user confirm the success of the authentication.

When the user authentication is not successful at the step S204 (S204: NO), predetermined abnormal termination processing for restricting an access to the agent unit 2 is executed (S208).

Figure 14:
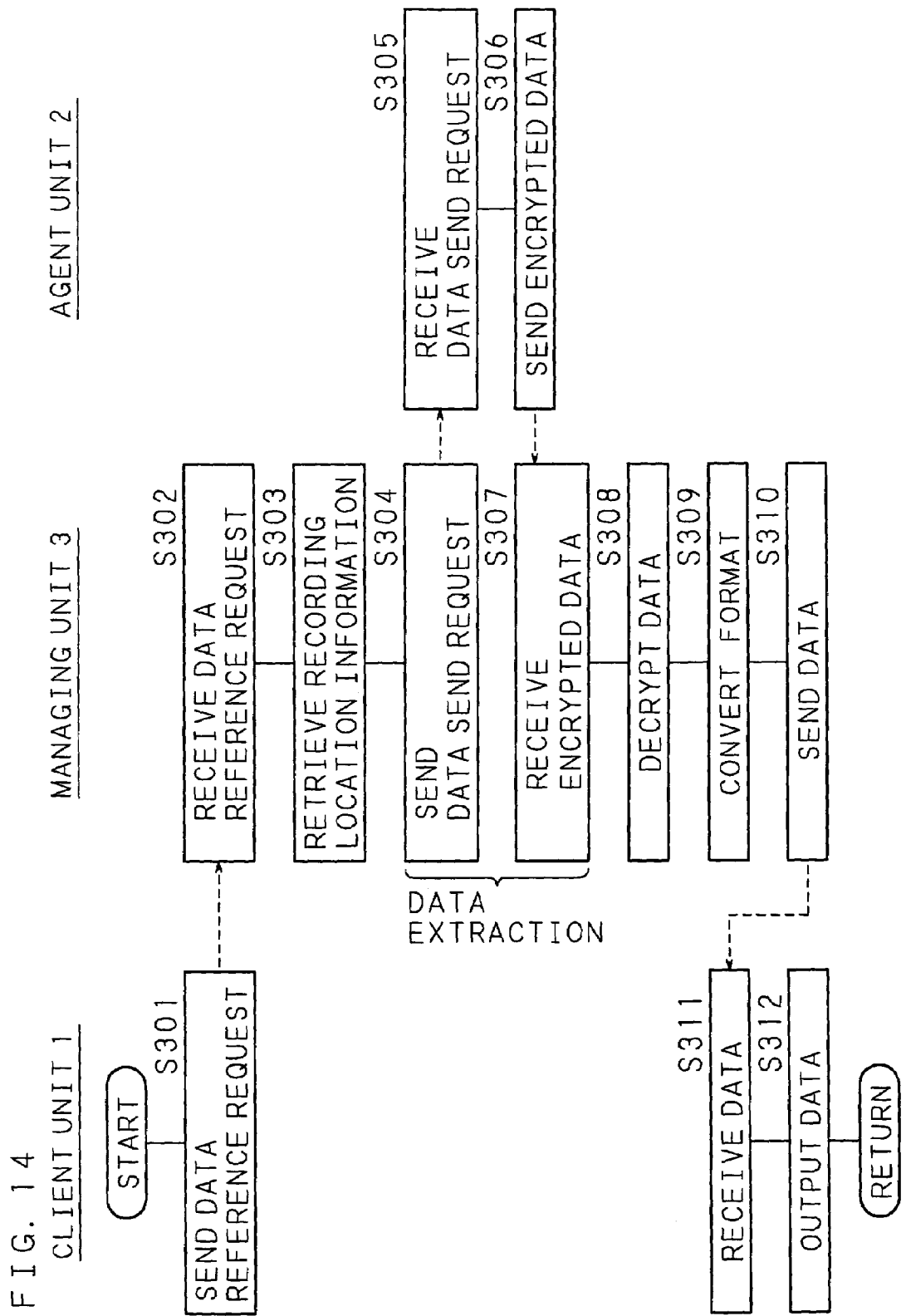
FIG. 14 is a flow chart showing data retrieval processing in the data managing system according to the present invention.

Next, data retrieval processing according to the second preferred embodiment in the data managing system of the present invention will be described with reference to the flow chart in FIG. 14.

Confirming the successful authentication, the user executes an operation of requesting an output of data recorded in the agent unit 2.

The client unit 1 accepts the operation by the user and sends a data reference request asking for data to the managing unit 3 (S301).

The managing unit 3 receives the data reference request (S302). In response to the received data reference request, the managing unit 3 retrieves the recording location information of the requested data from the saved recording location information (S303), and sends a data send request for requesting transmission of data to the agent unit 2 based on the searched recording location information (S304).

The agent unit 2 receives the data send request (S305), and sends encrypted data, which are obtained by encrypting the requested data which are requested in the received data send request, to the managing unit 3 (S306).

The managing unit 3 receives the encrypted data (S307) and decrypts the received encrypted data (S308).

In this manner, through the processing at the steps S304 to S307, data are extracted from the agent unit 2.

It is not always necessary to encrypt data. In a system in which a danger of leakage to outside is small, encrypting may be omitted so that a processing load upon the system is reduced.

The managing unit 3 converts the decrypted data into a predetermined format (S309), and sends the data converted into the predetermined format to the client unit 1 (S310).

With format information which is indicative of a conversion format included in the data sent to the managing unit 3, even if a predetermined format is not set in the managing unit 3 in advance, the managing unit 3 can perform format conversion.

The client unit 1 receives the data (S311) and outputs the received data (S312).

Thus, the data managing system of the present invention is characterized in that the functions of a database which is conventional single unit are independently assigned to the agent unit (data handling mechanism) 2, which handles accesses and the like to data recorded in recording means such as a CD-ROM and a hard disk, and the managing unit (data managing unit) 3 which manages the recording states of data, and as such, the data managing system of the present invention is applied to a variety of management of data.

Third Preferred Embodiment

A third preferred embodiment is an example that the client unit 1 has the function of the agent unit 2, a distribution apparatus such as a mail server is used as a distribution managing unit 8, and data recorded on a removable medium inserted inside or into the distribution managing unit 8 are handled. Therefore, to encrypt recording states in advance is desirable for the purpose of maintaining the security.

Figure 15:
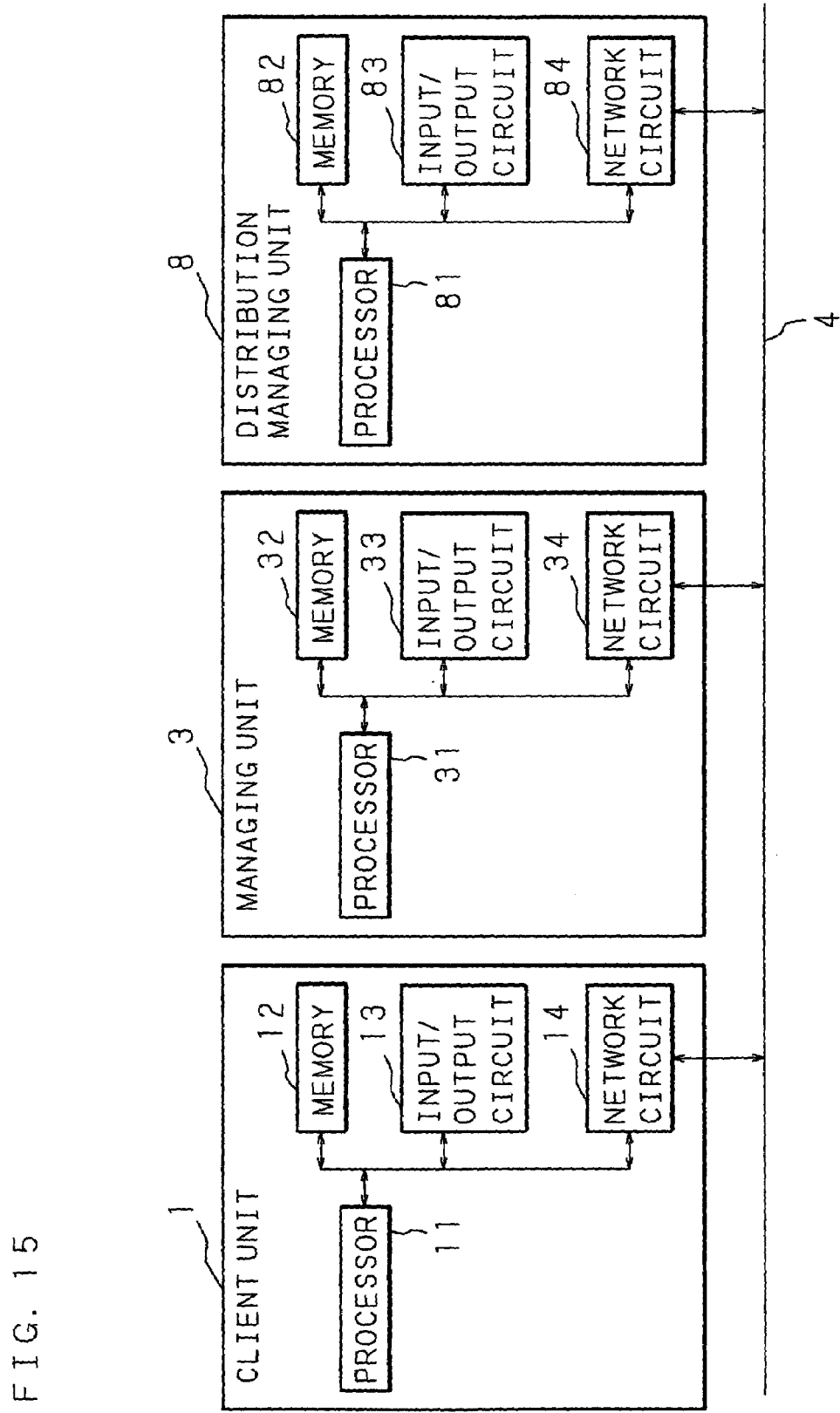
FIG. 15 is a block diagram showing a hardware configuration of a data managing system according to the present invention.

FIG. 15 is a block diagram showing a hardware configuration of the data managing system according to the third preferred embodiment of the present invention. The distribution managing unit 8, which comprises a processor 81, a memory 82, an input/output circuit 83 and a network circuit 84, is connected with the communication path 4.

Figure 16:
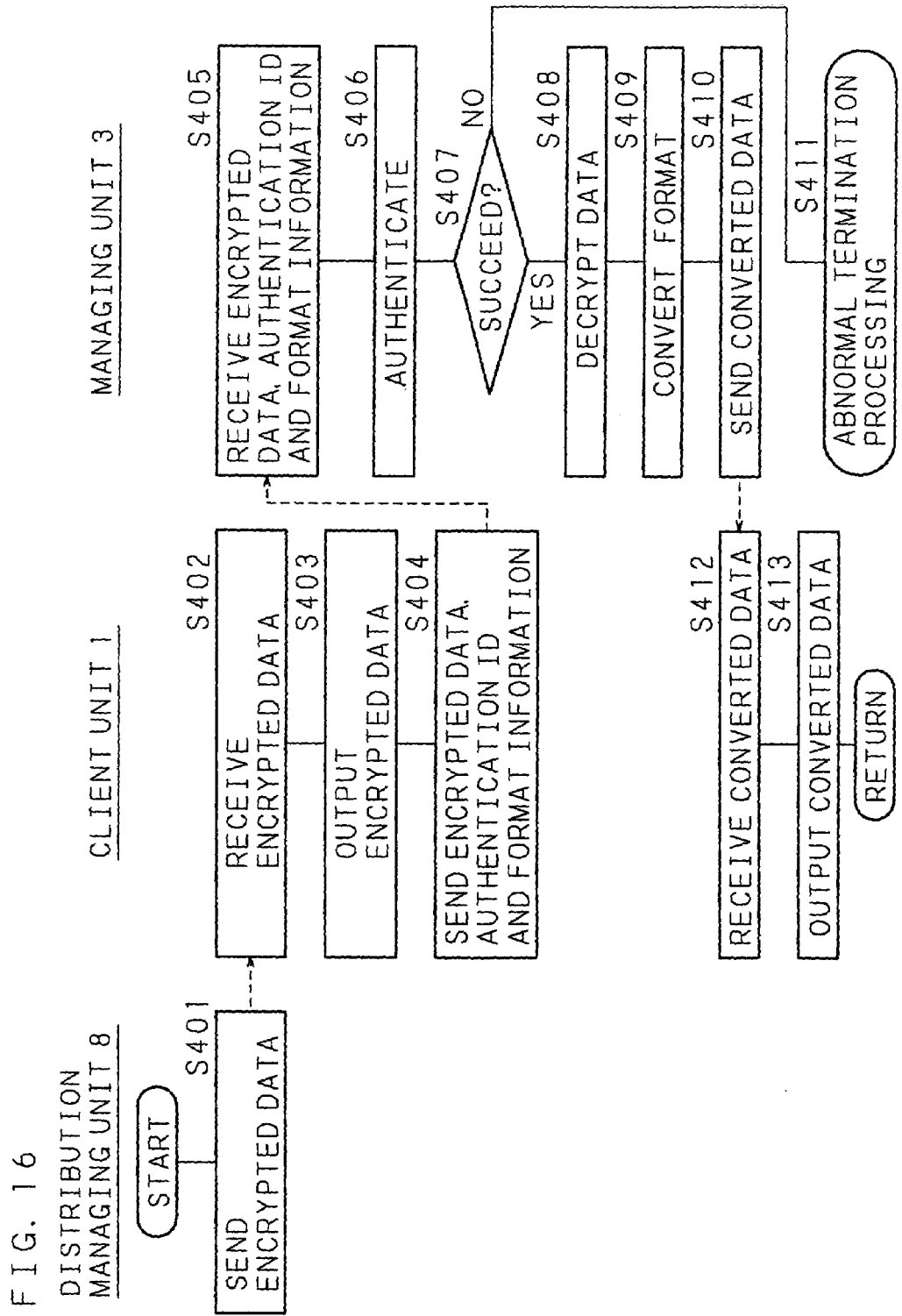
FIG. 16 is a flow chart showing authentication/data retrieval processing in the data managing system according to the present invention.

Next, authentication and data retrieval processing according to the third preferred embodiment in the data managing system of the present invention will be described with reference to the flow chart in FIG. 16.

Based on a protocol such as the POP (Post Office Protocol), a user operating the client unit 1 requests transmission of data from the distribution managing unit 8.

Accepting the request from the client unit 1, the distribution managing unit 8 sends recorded data which are encrypted and correspond to the received request to the client unit 1 as an e-mail, for instance (S401).

The client unit 1 receives the encrypted data (S402) and records (saves) the received encrypted data (S403).

The user executes an operation of confirming the encrypted data, starting a predetermined program received together with the data as the mail, and transmitting the encrypted data to the managing unit 3.

Accepting the operation, the client unit 1 transmits to the managing unit 3 the received encrypted data, an authentication ID recorded for authentication which denotes authority for transmission to the managing unit 3, and format information (catalogue information) which is indicative of an image format for outputting of data (S404).

The managing unit 3 receives the encrypted data, the authentication ID and the format information (S405), authenticates the user based on the received authentication ID (S406), and when the user authentication is successful (S407: YES), decrypts the received encrypted data (S408), converts the decrypted data into an image format which is expressed by the received format information (S409), and sends the converted data to the client unit 1 (S410).

Thus, obtaining a format for data conversion by the format information, the managing unit 3 is capable of responding even without set up in advance. While it is desirable in terms of general purpose that the conversion format is a format which uses page description means such as HTML and XML, it is possible to set a unique format in accordance with necessity.

When the user authentication is not successful at the step S407 (S407: NO), predetermined abnormal termination processing of notifying the client unit 1 of the failed user authentication is executed (S411). 82 The client unit 1 receives the converted data sent from the managing unit 3 (S412) and outputs the received data as a document image (S413).

Since the managing unit 3 performs the user authentication every time at outputting data based on the authentication ID distributed to and recorded in the client unit 1 in advance, it is possible to ensure a high level of security. It is also possible to specify the client unit 1 based on the authentication and charge the client unit 1 a fee in accordance with the performed processing. Such accounting allows to establish a new business modes which provides services to users who use this system.

While the foregoing has described that the data managing system of the present invention is realized with dedicated apparatuses in the first to the third preferred embodiment above, it is possible to realize the system using computers such as general-purpose personal computers and server computers.

Figure 17A:
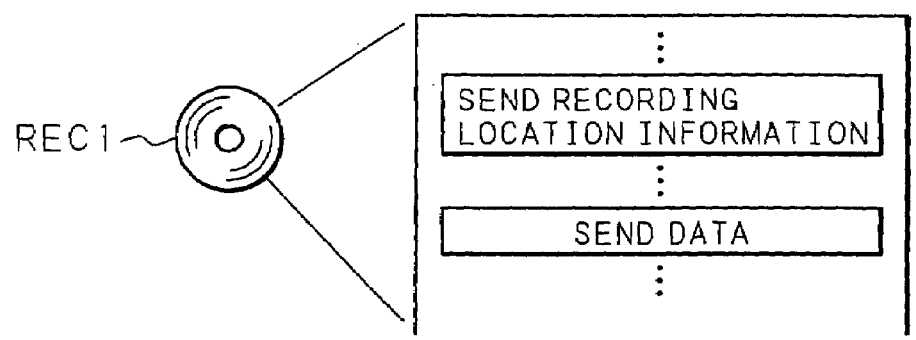
FIGS. 17A and 17B are conceptual explanatory diagrams of a recording medium which records a computer program for realizing apparatuses which are used in the data managing system according to the present invention.
Figure 17B:
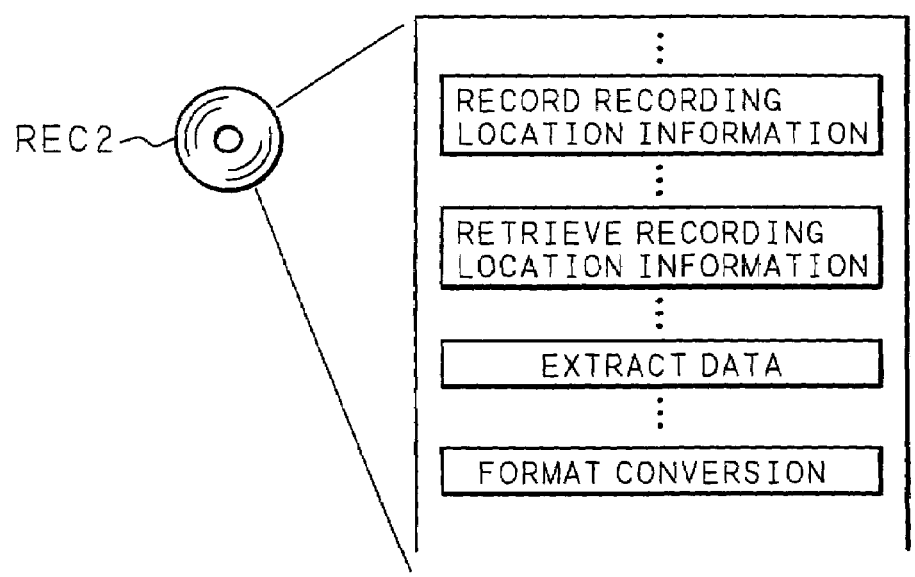

FIGS. 17A and 17B are conceptual explanatory diagrams of a recording medium which records a computer program for realizing the apparatuses which are used in the data managing system according to the present invention.

Reading and executing a program for data handling apparatus recorded on a recording medium REC1 such as a CD-ROM shown in FIG. 17A, a computer operates as the data handling apparatus 2 of the present invention. Reading and executing a program for data managing apparatus recorded on a recording medium REC2 shown in FIG. 17B, a computer operates as the data managing apparatus 3 of the present invention.

As described above, in the data managing system according to the present invention, the client unit which a user uses to request for data, the agent unit which saves encrypted document data and attributes information, the document managing unit which executes user authentication, access control and document image edition by means of decrypting of encrypted document data, each have a processing function and an interface function which are independent of each other, and are connected via a communication network. That is, since these units are constructed independently of each other in the data managing system according to the present invention, it is easy to add the client unit, the agent unit and the like, it is possible to deal with an increase in document data, users and the like with a low cost, and even when there is a change in output format due to a revision or the like to a legal system regarding document data, a modification to software in the document managing unit makes it possible to easily deal with the situation. Further, in the data managing system according to the present invention, since document data are stored as they are encrypted in the agent unit, even if electronic recording mediums holding document data are distributed to users, the data can not be decrypted except for through the document managing unit. Hence, the data managing system exhibits an excellent effect that there is an advantage that data are managed safely in terms of security as well, etc.

More specifically, in the data managing system according to the present invention, as data themselves are isolated from the managing unit which manages data conversion formats which are needed to output the data, the data themselves are managed on removable mediums and isolated from the system which is constructed by a group of apparatuses. Hence, it is not necessary to construct a special system, such as a redundant configuration, which is used just in case data are saved during a system failure in a conventional system wherein data and conversion formats for outputting the data are managed in the same apparatus, and it is possible to build an inexpensive system using personal computers, for instance. Further, since various types of data outputs are realized only by changing a conversion format for outputting which is managed by the data managing unit, the data managing system exhibits an excellent effect that it is possible to largely reduce load and time associated with the format change, easily realize common sharing of data, etc.

In addition, although a system is in charge of management of software which is for processing such as data management and data conversion according to the conventional techniques, while managing the software, the data managing system according to the present invention makes a user who operates the client unit manage data. Because of this, although users need to manage data, the workload for data management is considerably smaller than that needed for maintaining data and keeping the integrity of data by making a backup copy for instance. Thus, there is an excellent effect that it is possible to reduce the overall workload, a cost such as a labor cost, etc.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A data managing system, comprising:
   a client unit for producing a request for data;
   plural agent units each of which saves encrypted data files, each encrypted data file comprising document data representing a complete document and file specifying information specifying each data file; and
   a document managing unit for obtaining the file specifying information from each of said plural agents units, for, when document data is requested from the client unit, extracting the requested document data from one of said plural agent units according to the file specifying information, and for decrypting and editing the extracted encrypted document data into a document image; wherein
   said client unit and said plural agent units and said document managing unit each have independent processing functions and interface functions and are connected to one another via a communication network.

2. The data managing system as set forth in claim 1, wherein said client unit and one of said plural agent units are housed in a user terminal, and said document managing unit is disposed at a location remote from said user terminal and connected to said user terminal via the communication network.

* * * * *